United States Patent [19]

Bateman et al.

[11] 4,026,876
[45] May 31, 1977

[54] SOLUBLE POLYAMIDE-IMIDES DERIVED FROM PHENYLINDANE DIAMINES

[75] Inventors: John H. Bateman, Bardonia; David A. Gordon, Scarsdale, both of N.Y.

[73] Assignee: Ciba-Geigy Corporation, Ardsley, N.Y.

[22] Filed: Sept. 15, 1975

[21] Appl. No.: 613,131

Related U.S. Application Data

[63] Continuation-in-part of Ser. No. 542,144, Jan. 20, 1975, Pat. No. 3,983,092.

[52] U.S. Cl. ........................ 260/78 TF; 260/30.2; 260/30.4 N; 260/30.6 R; 260/30.8 R; 260/30.8 DS; 260/31.2 N; 260/32.2; 260/32.4; 260/32.6 N; 260/33.4 P; 260/33.8 R; 260/37 N; 260/46.5 E; 260/47 CP; 260/49; 260/63 R; 428/435; 428/458; 428/474

[51] Int. Cl.$^2$ ........................................ C08G 73/14
[58] Field of Search ............ 260/47 CP, 49, 46.5 E, 260/63 R, 65, 78 TF, 30.2, 30.4 N, 30.6 R, 30.8 R, 30.8 DS, 31.2 N, 32.2, 32.4, 32.6 N, 33.4 P, 33.8 R

[56] References Cited

UNITED STATES PATENTS 3,856,752  12/1974  Bateman et al. .................... 260/65

*Primary Examiner*—Lester L. Lee
*Attorney, Agent, or Firm*—Nestor W. Shust

[57] ABSTRACT

Polyamide-imides with phenylindane diamines incorporated into the polymer backbone have been found to be soluble in high concentration in polar organic solvents.

16 Claims, No Drawings

SOLUBLE POLYAMIDE-IMIDES DERIVED FROM PHENYLINDANE DIAMINES

RELATED APPLICATION

This application is a continuation-in-part of copending application Ser. No. 542,144, filed Jan. 20, 1975, now U.S. Pat. No. 3,983,092.

SUMMARY OF THE INVENTION

This invention relates to novel polyamide-imides derived from phenylindane diamines. More specifically, it relates to polyamide-imides composed of recurring structural units of the formula:

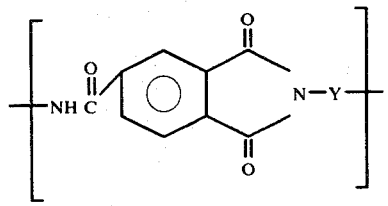

and the polyamide-amic acid precursors of these compositions of the formula:

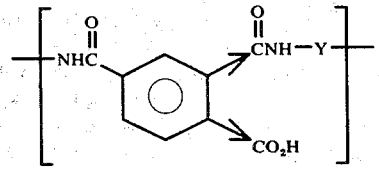

where the Y radical is wholly or partially derived from a phenylindane diamine and the arrows indicate isomerism.

It is well known that aromatic polyamide-imides are tough, thermally stable and flame resistant. The existing polyamide-imide polymers, however, have found only limited commercial acceptance due to certain undesirable properties. For example, in coating applications it is highly desirable for the polymer to be soluble in relatively non-polar volatile solvents so that solvent removal may be easily accomplished. Most high molecular weight polyamide-imides, however, are soluble or only marginally soluble and only in highly polar, non-volatile, expensive solvents. Furthermore, these solutions generally are not stable.

Special tedious methods have been developed to fabricate these polyamide-imides. One such method involves utilizing the more soluble polyamide-amic acid precursor and thermally imidizing this material after application. This procedure, however, releases volatiles at high temperatures and leaves voids in the polymer. In wire coating applications this necessitates making multiple coatings of thin films and imidizing the amic acid between coats. This process is expensive and inefficient; it would be desirable for the polyamide-imide to be sufficiently coated in one application. Furthermore, polyamide-amic acids are not stable at ordinary temperatures, especially when dissolved, and are extremely sensitive to hydrolysis by small amounts of water.

Another method developed to produce soluble polyamide-imides is to utilize isocyanate derivatives of the diamines in the reaction with trimellitic acid. This method, however, generally affords unstable solutions that advance in viscosity with time.

Another method that claims to afford soluble polyamide-imides is to preform the imide ring in the monomer before polymerization. This method involves a multiple sequence of steps, including preforming the imide ring, and is undesirable from an economic standpoint. It is an object of this invention to provide aromatic polyamide-imides capable of forming stable solutions in relatively non-polar solvents.

It is a further object of this invention to provide aromatic polyamide-imides with exceptionally high glass transition temperatures to permit their use in higher temperature environments than conventional polyamide-imides and specifically to improve the cut-through temperature of insulated conductors.

It has now been found that these objects can be attained by preparing polyamide-imides derived in whole or in part from diamines containing a phenylindane nucleus. The polyamide-imides of the invention are characterized by a recurring unit having the following structural formula:

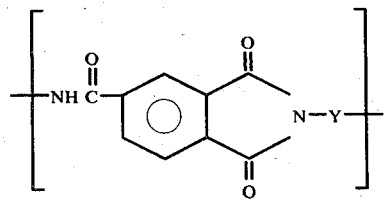

wherein Y is a divalent organic radial selected from carbocyclic-aromatic, aliphatic, araliphatic, cycloaliphatic, and heterocyclic radicals, combinations of these, and radicals with heteroatom containing bridging groups where the heteroatom in the bridge is oxygen, sulphur, nitrogen, silicon or phosphorus, provided that, out of the total number of polyamide-imide recurring units, 1 to 100 percent, preferably 10 to 100 percent of such units, have Y equal to a phenylindane radical of the structural formula

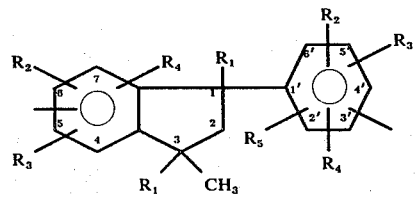

wherein $R_1$ is hydrogen or lower alkyl, preferably lower alkyl of 1 to 5 carbon atoms, and $R_2$, $R_3$, $R_4$ and $R_5$ are independently hydrogen, halogen or lower alkyl, preferably lower alkyl of 1 to 4 carbon atoms, and either aromatic ring of the unsymmetrical phenylindane radical may be bounded to an amide or imide nitrogen.

DETAILED DISCLOSURE

The phenylindane diamine component of the novel soluble polyamide-imide can consist of any combination of the isomeric or substituted isomeric diamino compounds represented by the structural formula

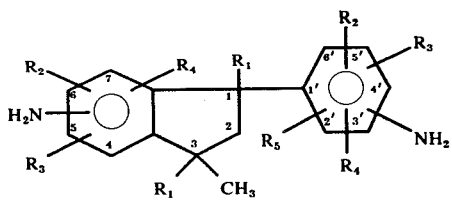

For example, the phenylindane diamine component can comprise from 0 to 100% of 5-amino-1-(4'-aminophenyl)-1,3,3-trimethylindane in combination with from 100 to 0% of 6-amino-1-(4'-aminophenyl)-1,3,3-trimethylindane. Further, either or both of these isomers can be substituted over the entire range from 0 to 100% by any of the substituted diamino isomers represented by formula I without impairing the novel soluble nature of these polyamide-imides. Examples of such substituted diamino isomers are 5-amino-6-methyl-1-(3'-amino-4'-methylphenyl)-1,3,3,-trimethylindane, 5-amino-1-(4'-amino-Ar', Ar'-dichlorophenyl)-Ar,Ar-dichloro-1,3,3-trimethylindane, 6-amino-1-(4'-amino'-Ar',Ar'-dichlorophenyl) -Ar,Ar-dichloro-1,3,3-trimethylindane, 4-amino-6-methyl-1-(3'-amino-4'-methylphenyl)-1,3,3-trimethyl-indane and Ar-amino-1-(Ar'amino-2', 4'-dimethylphenyl) -1,3,3,4,6 -pentamethylindane. The prefixes Ar and Ar' in the above formulas indicate indefinite positions for the given substituents in the phenyl rings.

Among the phenylindane diamines of the formula I, those are preferred in which $R_1$ is hydrogen or methyl, $R_2$ and $R_3$ independently of one another are hydrogen, methyl, chloro or bromo and $R_4$ and $R_5$ indpendently of one another are hydrogen, chloro or bromo. More preferred phenylindane diamines of the formula I are those in which $R_1$ is hydrogen or methyl, $R_2$ and $R_3$ independently of one another are hydrogen, methyl, chloro or bromo, $R_4$ and $R_5$ independently of one another are hydrogen, chloro or bromo, and the amino groups are at positions 5, 6 or 7 and at positions 3' or 4'. Among the phenylindane diamines of the formula I those are most preferred in which $R_1$ is hydrogen or methyl, $R_2$, $R_3$, $R_4$ and $R_5$ are hydrogen, and the amino groups are at positions 5 or 6 and at position 4'.

The phenylindane diamines of this invention may be prepared by various synthetic routes. The most preferable method of preparation is through the acid-catalyzed dimerization of styrene or substituted styrenes to produve the given phenylindane. Then, by subsequent nitration and reduction of the phenylindanes, the phenylindane diamines are produced. One method of achieving alkyl substitution on the aromatic rings of the phenylindane diamines is by subjecting alkyl substituted compounds such as benzaldehyde, acetophenone and the like to a Grignard reaction, followed by water removal to produce the alkyl substituted styrene compound. Dimerization, nitration and reduction can then be effected as mentioned above. Additionally, it has been found that chlorine gas effects direct chlorine substitution on the aromatic rings of diamino-1,3,3-trimethyl-1-phenylindane dihydrochloride to produce chlorinated diaminophenylindanes.

Characteristic of the solubilizing effect of the phenylindane diamines is their property of imparting solubility to systems derived in part from aromatic diamines through partial replacement of the diamine portion. Such solubilizing effect may be less pronounced in the case of some difficultly soluble polyamide-imides. However, in such systems, solubility may still be achieved at a suitably high phenylindane diamine/non-phenylindane ratio.

The group Y of the non-phenylindane diamines may be selected from alkylene groups containing from 2 12 carbon atoms; cycloalkylene groups containing from 4 to 6 carbon atoms; a xylylene group, arylene groups selected from ortho, meta or para-phenylene, xylylene, tolylene, biphenylene, napthylene or anthrylene; a substituted arylene group of the formula

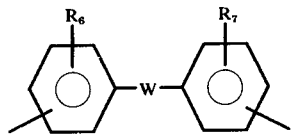

wherein W is a covalent bond, carbonyl,

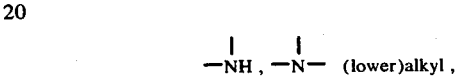

—O—,—S—,—SS—, —N-phenyl, sulfonyl, a linear or branched alkylene group of from 1 to 3 carbon atoms; arylene, especially phenylene group; or a dialkyl or diaryl silyl group; $R_6$ and $R^7$ are independent and each is hydrogen; halogen; especially chloro or bromo; lower alkyl, preferably lower alkyl of from 1 to 5 carbon atoms, especially methyl; lower alkoxy, preferably lower alkoxy containing from 1 to 5 carbon atoms, especially methoxy; or aryl, especially phenyl.

More preferably, Y embraces groups which are derived from the aromatic diamines disclosed in the immediately preceding paragraph. Most preferably, Y is a group having the formula

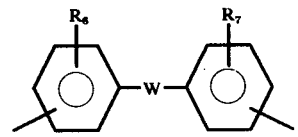

wherein w is a covalent bond, methylene, sulfur, oxygen, or sulfone, and $R_6$ and $R_7$ are independently hydrogen, halogen, or lower alkyl, preferably lower alkyl of from 1 to 5 carbon atoms, especially methyl, or a group having the formula

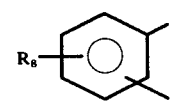

wherein $R_8$ is hydrogen, halogen or lower alkyl, preferably lower alkyl of from 1 to 5 carbon atoms, especially methyl.

Among the non-phenylindane diamines that can be employed in the preparation of the polyamide-imides of this invention are diamines as illustrated below:

4,4'-methylenebis(o-chloroaniline)
3,3'-dichlorobenzidine
3,3'-sulfonyldianniline
4,4'diaminobenzophenone
1,5-diaminonaphthalene
bis(4-aminophenyl)diethyl silane bis(4-aminophenyl)diphenyl silane
bis(4-aminophenyl)ethyl phosphine oxide
N-[bis(4-aminophenyl)]N-methyl amine
N-[bis(4-aminophenyl)]N-phenyl amine
4,4'- methylenebis(2-methylaniline)
4,4'-methylenebis(2-methoxyaniline)
4,4'-methylenebis(2-methylaniline)
4,4'-oxybis(2-methoxyaniline)
4,4'-oxybis(2-chloroaniline)
4,4'-thiobis(2-methylaniline)
4,4'-thiobis(2-methoxyaniline)
4,4'-thiobis(2-chloroaniline)
4,4'-sulfonylbis(2-methylaniline)
4,4'-sulfonylbis(2-ethoxyaniline)
4,4'-sulfonylbis(2-chloroaniline)
3,3'-dimethyl-4,4'-diaminobenzophenone
3,3'-dimethoxy-4,4'-diaminobenzophenone
3,3'-dichloro-4,4'-diaminobenzophene
4,4'-diaminobiphenyl
m-phenylenediamine
p-phenylenediamine
4,4'-methylenedianiline
4,4'-oxydianiline
4,4'-thiodianiline
4,4'-sulfonyldianiline
4,4'-isopropylidenedianiline
3,3'-dimethylbenzidine
3,3'-dimethoxybenzidine
3,3-dicarboxybenzidine
diaminotoluene
2,6-diaminopyridine
m-xylene diamine
p-xylylene diamine
bis-(4-aminocyclohexyl)methane
hexamethylene diamine
heptamethylene diamine
octamethylene diamine
nonamethylene diamine
decamethylene diamine
3-methylheptamethylene diamine
4,4-dimethylheptamethylene diamine
2,11-diaminododecane
1,2-bis(3-aminopropoxy)ethane
2,2-dimethylpropylene diamine
3-methoxyhexamethylene diamine
2,5-dimethylhexamethylene diamine
2,5-dimethylheptamethylene diamine
5-methylnonamethylene diamine
1-4 diaminocyclohexane
1,12-diamino-octadecane
$H_2N(CH_2)_2O-(CH)_2O(CH_2NH_2$
$H_2N(CH_2)_3 S(CH_2)_3NH_2$ The polyamide-imides of the present invention can be prepared by conventional methods. Thus, e.g., the diamine can be reacted with trimellitic anhydride acid chloride at a temperature below 100° C, preferably at or below room temperature, in an organic reaction medium which is a solvent for at least one of the reactants, preferably under substantially anhydrous conditions, and in presence of an acid acceptor to afford a polyamide-amic acid of the following formula:

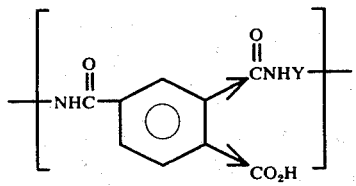

where the arrows indicate isomerism.

This polyamide-amic acid has a molecular weight such that its inherent viscosity is at least 0.1, preferably 0.3–5.0. The inherent viscosity is measured at 25° C at a concentration of 0.5% by weight of the polymer in a suitable solvent, e.g., N,N-dimethyl-acetamide, N-methylpyrrolidone, dimethylformamide, etc.

The polyamide-amic acid must be dehydrated (imidized to the polyamide-imide form to impart the thermal stability and extraordinary physical properties characteristic of the polymers of this invention. Depending upon the final application or end use of the polymer one of the following methods may be employed to imidize the polyamide-amic acid:

a. Chemical Imidization: The polyamide-amic acid is treated with a chemical dehydrating agent such as acetic anhydride in a suitable solvent, preferably the same reaction medium used to prepare the amic acid. The amic acid is contacted with the dehydrating agent for about 24 hours at room temperature or 3–4 hours at 50°–60° C in the presence of a basic catalyst such as pyridine and isolated by precipitation into a non-solvent.

b. Thermal Imidization. In one aspect of this method the amic acid is heated in a suitable solvent such as nitrobenzene until imidization is complete and isolated by precipitation into a non-solvent or by distillation of the solvent. With some solvents it is possible to isolate the product by simple filtration. Alternately, thermal imidization may be carried out by isolating the polyamide-amic acid and heating the neat polymer in an oven until the water of imidization is removed.

Thermal imidization may also be performed after application of the polyamide-amic acid to a substrate.

It is possible to alter the properties of the polyamide-imide by incorporating into the polymer dicarboxylic acids or dianhydrides, or both, as e.g., a portion of the trimellitic acid may be substituted by benzophenone tetracarboxylic acid dianhydride to attain a greater percentage of imide groups and thereby improve the thermal stability of the polymer. In the extreme case, all of the trimellitic acid component could be replaced by a dianhydride and diacid and a polyamide-imide within the spirt of this invention could still be achieved. Such polyamide-imide systems may be prepared by methods well known in the art.

Polyamide-imides heretofore known to the art have generally been extremely insoluble, and have not been shapeable after conversion from the polyamide-amic acid state to the polyamide-imide form. The polyamide-imides of the invention are extremely useful in that they can be dissolved in certain solvents, in relatively high concentration, and the solutions can be employed for further fabrication of the polyamide-imides. In this way, it is possible to produce polyamide-imide films, coatings, laminates and the like without the necessity of using a polyamide-amic acid intermediate with a follow-on conversion step. This is highly advantageous, because it permits the application of polyamide-imide coatings to articles which might be damaged by heating or chemical conversion techniques heretofore necessary.

The soluble polyamide-imides display excellent physical, chemical and electrical properties which render them capable of being used as adhesives, laminating resins, especially for printed circuit boards, fibers, coatings, especially for decorative and electrical purposes, films, wire enamels, molding compounds and engineering materials. Solutions of the phenylindane polyamide-imides of this invention can be used to impregnate reinforcing fibers and fabrics like glass, boron, metal oxide whiskers and graphite. These prepregs can then be cured to form rigid polyamide-imide laminates or composites or to form strong thermally resistant structural adhesive bonds between aluminum, stainless steel, titanium or other metals.

These polyamide-imides have very good solubility in common organic solvents. Examples of such organic solvents are the following:

N,N-dimethylformamide
N,N-dimethylacetamide
N-methyl-2-pyrrolidone
N,N-diethylformamide
N,N-diethylacetamide
N-methylcaprolactam
dioxane
dimethylsulfoxide
tetramethylurea
pyridine
dimethylsulfone
hexamethylphosphoramide
tetramethylene sulfone
formamide
N-methylformamide
γ-butyrolactone
tetrahydrofuran
m-cresol
2-methoxyethyl acetate
1,2-dimethoxyethane
bis (2-methoxyethyl) ether
chloroform
nitrobenzene.

The solvents can be used alone, in combinations of solvents, or in combination with poor solvents such as benzene, benzonitrile, xylene, toluene and cyclohexane.

More specifically, these polyamide-imides have been found to be soluble up to more than 60% in these solvents. The particular solubility achieved depends on various factors such as the nature of the solvent, the nature of the diamine employed and the extent of any replacement of the phenylindane diamines of the invention by other diamines. The solubilities attained are unique because the phenylindane moieties contained in the novel soluble polyamide-imides are themselves aromatic in character and might be expected to impart to their polyamide-imides the generally found characteristic of insolubility among aromatic polyamide-imides. Thus, it is most unusual that these phenylindane diamines can be reacted with trimellitic anhydride acid chloride and with aromatic diamines to produce the instant soluble polyamide-imides.

The soluble polyamide-imides can be precipitated from their solutions by use of methanol, water, acetone, spray drying and the like. The resulting granular material can be molded or redissolved in a suitable solvent to yield a film-forming or varnish type composition. Other appropriate ingredients can be added to the polyamide-imide solutions or molding powders including fillers, dyes, pigments, thermal stabilizers and reinforcing agents, such as glass fiber, carbon, boron and the like, depending on the end use.

These polyamide-imides have exceptionally high glass transition temperatures (Tg) and thermal stabilities which permit their use in high temperature applications. Wire coating and motor varnish are two important applications for which these materials are particularly suited. A partial list of specific applications for these materials is as follows:

1. Mold liners and containers for casting lower melting materials, including metals.
2. High temperature electrical insulation, such as slot liners, magnet wire, motor varnish.
3. Packaging of items to be exposed to high temperature or high energy radiation while still within package.
4. Laminated structures where the films are bonded to sheets or foil.
5. Capacitors.
6. Dry transformers.
7. Printed circuits.
8. Tape for hot pipe overwrapping.
9. Aircraft radoms.

To further illustrate the nature of this invention and the process employed in preparing the soluble polyamide-imides, the following examples are given below.

EXAMPLE 1

1,3,3-Trimethyl-1-phenylindane

To 6.0 kg. of 62% sulfuric acid at 50° C was added 1.0 kg. of α-methyl-styrene over a 5 minute period. The mixture was refluxed (145° C) for 20 hours. After cooling, the lower acid phase was drawn off and discarded. The organic phase was washed with sulfuric acid several times and then with water several times. The product was recrystallized from methanol which afforded 750 g of white crystals with a melting point of 50.5° C–52.0° C. The yield was 75%.

By essentially following the above procedure and substituting α,3,4-trimethylstyrene for α-methylstyrene there is obtained a mixture of tetramethyl phenylindanes in 95% yield.

EXAMPLE 2

5(6)-Amino-1-(4'-aminophenyl)-1,3,3-trimethylindane (a) Preparation of 5,4'-dinitro- and 6,4'-dinitro-1,3,3-trimethyl-1-phenylindane isomers To a solution of 236 g (1.0 mole) 1,3,3-trimethyl-1-phenylindane (α-methylstyrene dimer) in 750 ml chloroform at 2°–8° C was added a previously mixed solution of 396 ml sulfuric acid and 132 ml nitiric acid dropwise over a 2.5 hour period. The two phase reaction mixture was allowed to stir an additional 4 hours at 5° C. The chloroform phase was isolated and washed with aqueous sodium bicarbonate until neutral and then with distilled water. A light yellow oil was obtained after drying and stripping the chloroform solution. Two triturations in hexane at room temperature afforded 295 g light yellow powder, melting point 109°–125°. This material was shown to be a mixture of the 5,4'-dinitro- and 6,4'-dinitro-1,3,3-trimethyl-1-phenylindane isomers by NMR analysis.

Analysis for $C_{18}H_{18}N_2O_4$: % Calculated: C, 66.25; H, 5.55; N, 8.58. % Found: C, 66.13; H, 5.50; N, 8.42.

(b) Preparation of 5(6)-Amino-1-(4'-aminophenyl)-1,3,3-trimethylindane

A mixture of 250 g (0.767 mole) of the dinitro isomers and 250 g (4.60 g - atoms) reduced in iron powder in 1 liter 50% aqueous ethanol was brought to reflux and a previously prepared solution of 60 ml concentrated hydrochloric acid in 400 ml 50% aqueous ethanol was added over a 1 hour period. Reflux was continued an additional 3 hours, the reaction cooled to 50° and 50 ml concentrated hydrochloric acid added. The reaction mixture was filtered. The filtrate was made basic with 20% NaOH and extracted with ether, dried and stripped under vacuum to afford 145 g (71%) of a clear brown glassy solid melting point 47°–54°. NMR analysis indicated the product was 62% 6-amino- and 38% 5-amino-1-(4'-aminophenyl)-1,3,3-trimethylindane.

Analysis for $C_{18}H_{22}N_2$: % Calculated: C, 81.18; H, 8.32; N, 10.52. % Found: C, 81.27; H, 8.20; N, 10.48.

EXAMPLE 3

Preparation of Polyamide-imide from 4,4'-Methylenedianiline and Trimellitic Anhydride Acid Chloride To a 300 ml. flask fitted with mechanical stirrer, nitrogen inlet and cooling bath was added 5.00 grams (0.0252 mole) 4,4'-methylenedianiline and 65 ml. N,N-dimethylacetamide. The reaction mixture was stirred until solution was achieved and 2.57 grams (0.0254 mole) triethylamine was added. The reaction mixture was then cooled with ice and 5.31 grams (0.0252 mole) trimellitic anhydride acid chloride was added all at once. Cooling was continued until the trimellitic anhydride acid chloride had dissolved. The cooling bath was removed and the reaction was continued for 3 hours at room temperature during which time the triethylamine hydrochloride precipitated as a crystalline solid. The polyamic acid was precipitated into rapidly stirring cold water, recovered by filtration, washed thoroughly and dried at 50° C/50 mm.Hg vacuum. The polyamic acid was a fiberous, yellow solid.

The polyamide-imide was prepared by treating 2 grams of the polyamic acid, partially dissolved in 20 ml. N-methyl-2-pyrrolidone, with 3 grams (0.03 mole) acetic anhydride and 1 gram (0.01 mole) pyridine at room temperature. The polyamide-imide gelled almost immediately after addition of the acetic anhydride and pyridine.

EXAMPLE 4

Preparation of Polyamide-imide from 5(6)-Amino-1(4'-amino-1-(4'-aminophenyl)-1,3,3-trimethylindane and Trimellitic Anhydride Acid Chloride Solution Method To a 500 ml. flask fitted with mechanical stirrer and nitrogen inlet was added 20.20 grams (0.0758 mole) 5(6)-amino-1-(4'-aminophenyl)-1,3,3-trimethylindane and 260 ml. N,N-dimethylacetamide. The reaction mixture was stirred until solution was achieved and 7.73 grams (0.0763 mole) triethylamine was added. The reaction mixture was then cooled using an ice bath and 15.97 grams (0.0758 mole) trimellitic anhydride acid chloride was added all at once. The ice bath was removed after the trimellitic anhydride acid chloride had dissolved. Reaction was continued for 3 hours at room temperature during which time triethylamine hydrochloride precipitated as a crystalline solid. The polyamic acid was precipitated by adding the reaction mixture to rapidly stirring cold water. The polyamic acid was then recovered by filtration, washed thoroughly and dried at 50° C/50 mm.Hg vacuum. The polyamic acid, a white powdery solid, had an inherent viscosity of 0.22 (0.5% in N-methyl-2-pyrrolidone).

The polyamide-imide was prepared by treating 25 grams of the polyamic acid, dissolved in 150 ml. N-methyl-2-pyrrolidone, with 30 grams (0.3 mole) acetic anhydride and 3 grams (0.04 mole) pyridine at room temperature for 18 hours. The polyamide-imide was precipitated into water, recovered by filtration, washed thoroughly and dried at 80° C/50 mm.Hg vacuum. The polyamide-imide, a yellow powdery solid, had an inherent viscosity of 0.29 (0.5% in N-methyl-2-pyrrolidone at 25° C).

EXAMPLE 5

Preparation of Polyamide-imide from 5(6)-Amino-1-(4'-aminophenyl)-1,3,3-trimethylindane and Trimellitic Anhydride Acid Chloride Interfacial Method To a 1 quart commercial blender was added a solution consisting of 5.4901 grams (0.0206 mole) 5(6)-amino-1-(4'-aminophenyl)-1,3,3-trimethylindane, 36.1 grams acetone, 10.3 grams water and 2.17 grams (0.0214 mole) triethylamine. This solution was mixed at medium speed and a solution consisting of 4.3399 grams (0.0206 mole) trimellitic anhydride acid chloride and 15.5 grams acetone was added all at once. A gelatinous precipitate formed almost immediately and the stirring speed was increased to maximum. The reaction was continued for 15 minutes at which time 500 ml. of hot water was added to precipitate the polyamic acid. The polyamic acid was recovered by filtration, washed thoroughly and dried at 50° C/50 mm.Hg vacuum. The polyamic acid was a yellow, powdery solid. The inherent viscosity of the polyamic acid was 0.39 (0.5% in N-methyl-2-pyrrolidone at 25° C).

The polyamide-imide was prepared by treating a solution of 6 grams polyamic acid in 34 ml of N-methyl-2-pyrrolidone with 7 grams (0.07 mole) acetic anhydride and 1 gram (0.01 mole) pyridine at 80° C for 2 hours. The polyamide-imide was precipitated into cold water, recovered by filtration, washed thoroughly and dried at 80° C/50 mm.Hg vacuum. The dried polyamide-imide, a yellow powdery solid, had an inherent viscosity of 0.45 (0.5% in N-methyl-2-pyrrolidone at 25° C) and was 40% soluble in dimethylformamide, N,N-dimethylacetamide, N-methyl-2-pyrrolidone, m-cresol, tetrahydrofuran, dioxane, glyme, diglyme, and cyclohexanone. The polyamide-imide had a glass transition temperature (Tg) of 350° C (by torsional braid analysis).

EXAMPLE 6

Preparation of Polyamide-imide Copolymers

By essentially following the procedures described in Examples 4 and 5, the following polyamide-imide copolymers of 5(6)-amino-1-(4'-aminophenyl)-1,3,3-trimethylindane (PIDA) and 4,4'-methylenedianinline (MDA) with trimellitic anhydride were prepared:

| Composition | I.V. (0.5% NMP, 25°)[a] Amic Acid | Amide-imide | Solubility (20% NMP) |
|---|---|---|---|
| 70% PIDA/30% MDA | 0.24 | 0.31 | Solution |
| 60% PIDA/40% MDA | 0.36 | 0.38 | Solution |
| 50% PIDA/50% MDA | 0.34 | 0.40 | Solution |
| 40% PIDA/60% MDA | 0.37 | 0.43 | Solution |
| 30% PIDA/70% MDA | 0.36 | 0.35 | Solution |
| 20% PIDA/80% MDA | 0.29 | 0.36 | Solution |
| 10% PIDA/90% MDA | 0.39 | 0.45 | Solution |
| — 100% MDA | — | — | insol |

[a]inherent viscosity in NMP (N-methylpyrrolidone) at 25° C (0.5%)
[b]obtained by torsional braid analysis

EXAMPLE 7

By essentially following the procedure described in Example 4, soluble polyamide-imides are obtained by reacting equivalent amounts of trimellic anhydride acid chloride and of each of the following aromatic diamine mixtures:

a. 50 mole % 5(6)-amino-1(4'-aminophenyl)-1,3,3-trimethylindane (PIDA) and 50 mole % 4,4'-methylenebis-(o-chloroaniline)

b. 50 mole % PIDA and 50 mole % 4,4'-sulfonyldianiline c. 50 mole % PIDA and 50 mole % m-phenylenediamine d. 50 mole % PIDA and 50 mole % p-phenylenediamine

EXAMPLE 8

By essentially following the procedure of Example 4, and replacing the 5(6)-amino-1-(4'-aminophenyl)-1,3,3-trimethylindane reacted in that example by the following aromatic diamines:

a. 5-amion-6-methyl-1-(3'-methylphenyl)-1,3,3-trimethylindane; and b. an isomeric mixture of 5-amino-1-(4'-amino-Ar',Ar'-dichlorophenyl)-Ar,Ar-dichloro-1,3,3-trimethylindane and 6-amino-1-(4'-amino-Ar',Ar'-dichlorophenyl)-Ar,Ar-dichloro-1,3,3-trimethylindane, there are obtained soluble polyamides.

What is claimed is:

1. A soluble polyamide-imide consisting essentially of the recurring unit having the formula

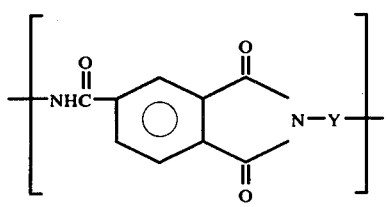

wherein Y is a divalent organic radical selected from carbocyclic-aromatic, aliphatic, araliphatic, cycloaliphatic, and heterocyclic radicals, combinations of these, and radicals with heteroatom-containing bridging groups where the heteroatom in the bridge is oxygen, sulfur, nitrogen, silicon or phosphorus, provided that, out of the total number of polyamide-imide recurring units, 1 to 100 percent of such units have Y equal to a phenylindane radical of the structural formula

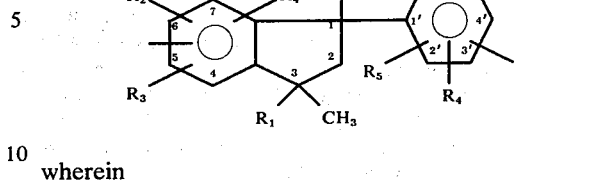

wherein $R_1$ is hydrogen or lower alkyl and $R_2$, $R_3$, $R_4$ and $R_5$ are independently hydrogen, halogen or lower alkyl, and either aromatic ring of the unsymmetrical phenylindane radical may be bonded to an amide or imide nitrogen.

2. A polyamide-imide of claim 1 wherein Y is a mixture of a. the phenylindane radical, and b. a radical equal to an alkylene group containing from 2 to 12 carbon atoms; a cycloalkylene group containing from 4 to 6 carbon atoms; an arylene group selected from ortho, meta or para phenylene, xylylene, tolylene, biphenylene, napthylene or anthrylene; a substituted arylene group of the formula

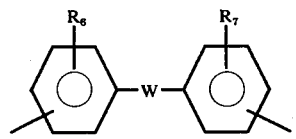

wherein W is a covalent bond, carbonyl,

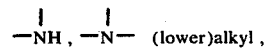

—O—, —S—, —SS—, —N-phenyl, sulfonyl, a linear or branched alkylene group of from 1 to 3 carbon atoms, arylene, or a dialkyl or diaryl silyl group and $R_6$ and $R_7$ are independent and each is hydrogen; halogen; lower alkyl; lower alkoxy; or aryl; or to a mixture of these groups.

3. A polyamide-imide of claim 1 wherein Y is equal to the phenylindane radical to 100 percent of the polyamide-imide recurring units.

4. A polyamide-imide of claim 1 wherein Y is a mixture of a. the phenylindane radical wherein $R_1$-$R_5$ are independently hydrogen or methyl, and b. a radical equal to i. a group of the formula

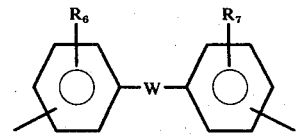

wherein W is a covalent bond, methylene, sulfur, oxygen or sulfone and $R_6$ and $R_7$ are independently hydrogen, halogen or lower alkyl, ii. a group of the formula

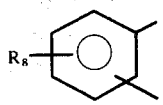

wherein $R_8$ is hydrogen, halogen, or lower alkyl, or
  iii. a mixture of said groups

5. A polyamide-imide of claim 1 where in 100 percent of the polyamide-imide recurring units Y is equal to a mixture of

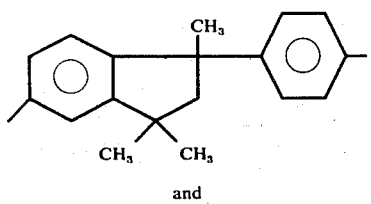

and

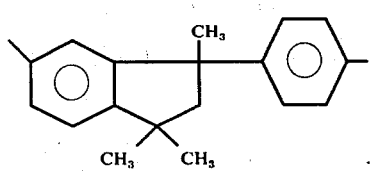

6. A polyamide-imide of claim 1 wherein Y is a mixture of (a)

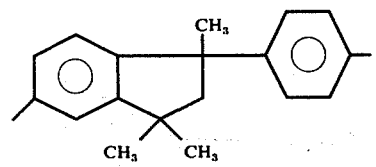

and

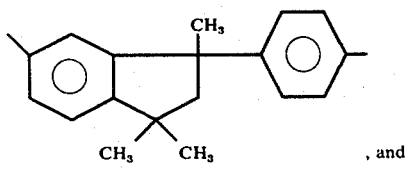

, and b. a radical equal to
  i. a group of the formula

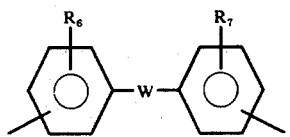

wherein W is a covalent bond, methylene, sulfur, oxygen or sulfone and $R_6$ and $R_7$ are independently hydrogen, halogen or lower alkyl,
  ii. a group of the formula

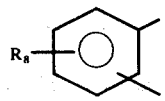

wherein $R_8$ is hydrogen, halogen, or lower alkyl, or
  iii. a mixture of said groups.

7. A polyamide-imide of claim 1 wherein Y is a mixture of (a)

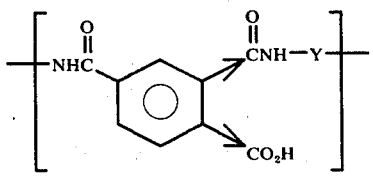

b. a radical equal to a group of the formula a mixture of these radicals.

8. A soluble polyamide-amic acid consisting essentially of the recurring unit having the formula wherein Y is a divalent organic radical selected from carbocyclic-aromatic, aliphatic, araliphatic, cycloaliphatic, and heterocyclic radicals, combination of these, and radicals with heteroatom-containing bridging groups where the heteroatom in the bridge is oxygen, sulfur, nitrogen, silicon or phosphorus, provided that, out of the total number of polyamide-imide recurring units, 1 to 100 percent of such units have Y equal to a phenylindane radical of the structural formula

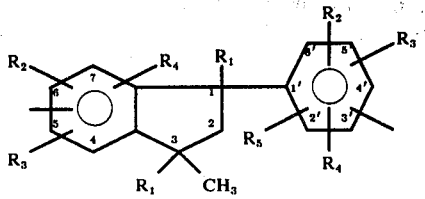

wherein
R₁ is hydrogen or lower alkyl, and
R₂, R₃, R₄ and R₅ are independently hydrogen, halogen or lower alkyl.

9. A polyamide-amic acid of claim 8 wherein Y is a mixture of
  a. the phenylindane radical, and
  b. a radical equal to an alkylene group containing from 2 to 12 carbon atoms; a cycloalkylene group containing from 4 to 6 carbon atoms; an arylene group selected from ortho, meta or para phenylene, xylylene, tolylene, biphenylene, napthylene or anthrylene; a substituted arylene group of the formula

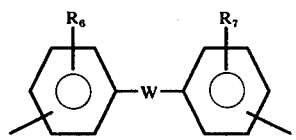

wherein W is a covalent bond, carbonyl,

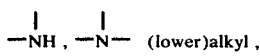

—O—, —S—, —SS—, —N-phenyl, sulfonyl, a linear or branched alkylene group of from 1 to 3 carbon atoms, arylene, or a dialkyl or diaryl silyl group and R₆ and R₇ are independent and each is hydrogen; halogen; lower alkyl; lower alkoxy; or aryl; or to a mixture of these groups.

10. A polyamide-amic acid of claim 8 wherein Y is equal to the phenylindane radical in 100 percent of the polyamide-amic acid recurring units.

11. A polyamide-amic acid of claim 8 wherein Y is a mixture of
  a. the phenylindane radical wherein R₁-R₅ are independently hydrogen or methyl, and
  b. a radical equal to
    i. a group of the formula

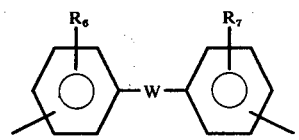

wherein W is a covalent bond, methylene, sulfur, oxygen or sulfone and R₆ and R₇ are independently hydrogen, halogen or lower alkyl,
    ii. a group of the formula

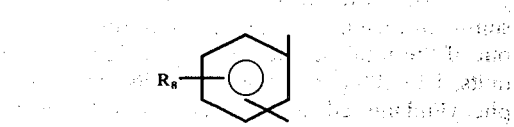

wherein R₈ is hydrogen, halogen, or lower alkyl, or
    iii. A mixture of said groups.

12. A polyamide-amic acid of claim 8 wherein 100 percent of the polyamide-amic acid recurring units Y is equal to a mixture of

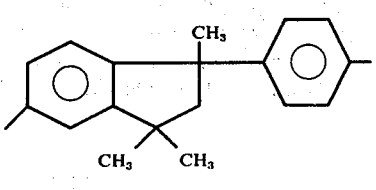

and

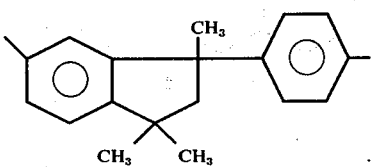

13. A polyamide-amic acid of claim 8 wherein Y is a mixture of (a)

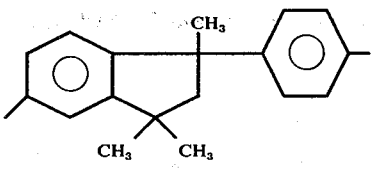

and

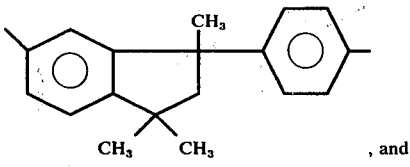

, and b. a radical equal to
    i. a group of the formula

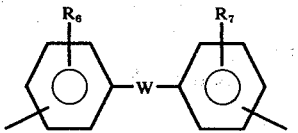

wherein W is a covalent bond, methylene, sulfur, oxygen or sulfone and R₆ and R₇ are independently hydrogen, halogen or lower alkyl,
    ii. a group of the formula

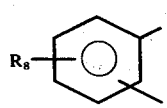

wherein R₈ is hydrogen, halogen, or lower alkyl, or
    iii. a mixture of said groups.

14. A polyamide-amic acid of claim 8 wherein Y is a mixture of (a)
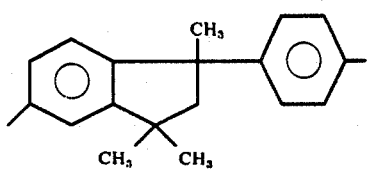
and
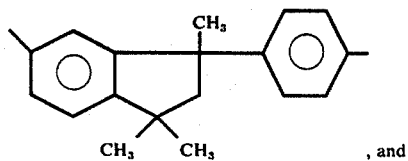
, and
b. a radical equal to a group of the formula
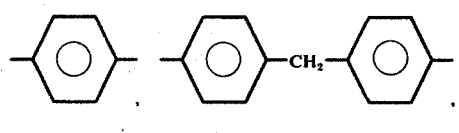
-continued
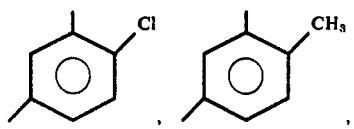
,
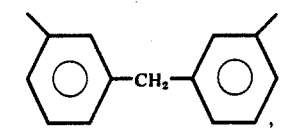
,
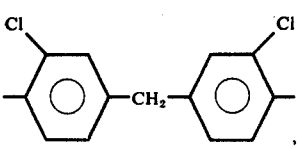
, or
a mixture of these radicals.
15. A composition of matter which is comprised of a soluble polyamide-imide of claim 1 in an organic solvent.
16. A composition of matter which is comprised of a soluble polyamide-amic acid of claim 8 in an organic solvent.
* * * * *